(12) United States Patent
Jiang et al.

(10) Patent No.: US 9,624,325 B2
(45) Date of Patent: Apr. 18, 2017

(54) CURABLE FLUOROCOPOLYMER FORMED FROM TETRAFLUOROPROPENE

(71) Applicant: Honeywell International Inc., Morristown, NJ (US)

(72) Inventors: Wanchao Jiang, Shanghai (CN); Shijun Feng, Shanghai (CN); Siyuan Zhang, Shanghai (CN); Yun Lin, Shanghai (CN); Andrew J. Poss, Kenmore, NY (US)

(73) Assignee: HONEYWELL INTENATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/463,747

(22) Filed: Aug. 20, 2014

(65) Prior Publication Data
US 2015/0112015 A1   Apr. 23, 2015

Related U.S. Application Data

(60) Provisional application No. 61/894,146, filed on Oct. 22, 2013.

(51) Int. Cl.
*C08F 214/18* (2006.01)
*C09D 127/12* (2006.01)

(52) U.S. Cl.
CPC ........ *C08F 214/188* (2013.01); *C08F 214/18* (2013.01); *C08F 214/186* (2013.01); *C09D 127/12* (2013.01)

(58) Field of Classification Search
CPC .............. C08F 214/188; C08F 214/186; C08F 214/182; C08F 127/12; C09D 127/12
See application file for complete search history.

(56) References Cited

U.S. PATENT DOCUMENTS

| | | | |
|---|---|---|---|
| 4,622,364 A | 11/1986 | Ohmori et al. | |
| 5,206,320 A * | 4/1993 | Vara | C08F 214/188 526/249 |
| 5,304,617 A * | 4/1994 | Kodama | C08F 214/188 526/242 |
| 5,464,897 A | 11/1995 | Das et al. | |
| 6,403,744 B1 | 6/2002 | Akama et al. | |
| 7,144,948 B2 | 12/2006 | Yamauchi et al. | |
| 7,947,791 B2 * | 5/2011 | Nomura | C08F 214/18 526/242 |
| 8,236,923 B2 | 8/2012 | Ito et al. | |
| 2003/0153703 A1 * | 8/2003 | Funaki | C08F 214/265 526/253 |
| 2008/0153977 A1 | 6/2008 | Samuels | |
| 2008/0153978 A1 * | 6/2008 | Samuels | C08F 14/18 525/55 |
| 2011/0097529 A1 | 4/2011 | Durali et al. | |
| 2012/0108753 A1 * | 5/2012 | Takemura | C08L 27/12 525/199 |
| 2012/0184653 A1 | 7/2012 | Wang et al. | |
| 2013/0089671 A1 | 4/2013 | Nalewajek et al. | |
| 2013/0090439 A1 | 4/2013 | Lu et al. | |
| 2014/0080987 A1 * | 3/2014 | Feng | C08F 214/186 526/249 |
| 2014/0147480 A1 * | 5/2014 | Lu | A01N 29/02 424/405 |
| 2014/0339167 A1 * | 11/2014 | Lu | B01D 71/32 210/650 |

FOREIGN PATENT DOCUMENTS

EP            0508229 A2 * 10/1992   .......... C08F 214/188
WO     WO 2012/147569 A1   11/2012

* cited by examiner

*Primary Examiner* — Nicole M Buie-Hatcher
(74) *Attorney, Agent, or Firm* — Bruce O. Bradford

(57) ABSTRACT

The present invention is directed to partially fluorinated copolymers and the production thereof. More specifically, the copolymers, which are preferably produced by a solution polymerization process, preferably have at least three units, the first unit selected from 2,3,3,3-tetrafluoropropene and 1,3,3,3-tetrafluoropropene, the second unit having a polymerized monomer selected from the vinyl esters and vinyl ethers, and the third unit having a polymerized monomer derived from a hydroxyl group-containing vinyl ether. The resulting copolymer is environmentally friendly, has favorable molecular weight characteristics, and may be shipped economically in high concentration.

31 Claims, No Drawings

CURABLE FLUOROCOPOLYMER FORMED FROM TETRAFLUOROPROPENE

CROSS-REFERENCE TO RELATED APPLICATIONS

The present application claims priority from U.S. Provisional Application Ser. No. 61/894,146, filed 22 Oct. 2013, the disclosure of which is hereby incorporated herein by reference. The '146 Provisional Application is related to U.S. application Ser. No. 13/645,444, filed on Oct. 4, 2012, U.S. Application Ser. No. 13/645,437, filed on Oct. 4, 2012, U.S. Provisional Application No. 61/543,780, filed on Oct. 5, 2011, and U.S. Provisional Application No. 61/543,714, filed on Oct. 5, 2011, the contents of which are hereby incorporated herein by reference in their entirety.

FIELD OF THE INVENTION

The present invention generally relates to novel curable copolymers formed, at least in part, from tetrafluoropropene. More specifically, the present invention relates to curable copolymers formed in part from monomeric material comprising 2,3,3,3-tetrafluoropropene ($CF_3CF=CH_2$, "HFO-1234yf") and/or 1,3,3,3-tetrafluoropropene ($CH_2=CFCF_3$, "HFO-1234ze"), and to compositions and uses thereof.

BACKGROUND OF THE INVENTION

Fluoropolymers such as polytetrafluoroethylene (PTFE), polychlorotrifluoro-ethylene (PCTFE) and polyvinylidene fluoride (PVDF) are well known for having excellent thermal, chemical, and weather resistance, along with favorable properties like water and oil resistance. Unfortunately, the use of such fluoropolymers in coatings is difficult owing to their poor solubility in industrial solvents—such as xylene and butyl acetate—which are typically used in the coating industry. Instead, more exotic solvents must often be used, which not only affect the economics of a coating, but can also present environmental issues owing to, e.g., potential toxicity of the exotic solvents.

Accordingly, there is a need to formulate alternative coatings which have superior performance properties, yet can use economical industrial solvents and be environmentally friendly.

Furthermore, polymerization of fluorinated polymers presents a number of challenges, e.g., as detailed in prior application Ser. No. 13/645,437 (now U.S. Patent Publication No. 2013/0090439 A1), incorporated herein by reference. Although several types of polymerization methods to make tetrafluoropropene copolymers have been described in prior application Ser. No. 13/645,437, Applicants have come to further appreciate that these polymerization methods have undesirable aspects or limitations, and/or that the polymers produced thereby can be formed with different and/or improved properties.

Accordingly, Applicants have come to appreciate a need to develop improved processes for making tetrafluoropropene copolymers having different and/or improved properties for uses in various applications.

SUMMARY OF THE INVENTION

In accordance with a first aspect of the present invention, a curable fluorocopolymer can be formed by solution copolymerization of the monomers represented by (a), (b) and (c):

(a) 40 to 60 mol % of tetrafluoropropene;

(b) 5 to 45% of vinyl ether or vinyl ester or both of them, represented by formula $CH_2=CR1-O(C=O)_xR2$ and $CH_2=CR3-OR4$ respectively, wherein R1 and R3 is hydrogen or a methyl group, and wherein R2 and R4 is an unsubstituted straight-chain, branched-chain or alicyclic alkyl group having 1 to 12 carbon atoms; and (c) 3 to 30 mol % of hydroxyalkyl vinyl ether, represented by formula $CH_2=C-R5-OR6$, wherein R5 is hydrogen or a methyl group, and R6 is an unsubstituted straight-chain, branched-chain or alicyclic alkyl group having a hydroxyl groups.

In accordance with a second aspect of the present invention, the tetrafluoropropene is selected from either or both of HFO-1234yf and HFO-1234ze. In accordance with the present invention, the applicants have found that environmentally friendly HFO-1234yf and HFO-1234ze can each, and in combination, be employed advantageously as fluorinated monomers for the production of polymeric coatings.

In accordance with a third aspect of the present invention, a product containing the curable fluorocopolymer has a solvent content of 15-50%, and preferably, 15-25%, so as to provide a concentrated product which is economical to ship to the user of the product.

DETAILED DESCRIPTION OF THE INVENTION

In accordance with a preferred embodiment of the present invention, the 40-60 mol % tetrafluoropropene in the form of HFO-1234yf and/or HFO-1234ze is used as component (a), and most preferably, 45 to 55 mol %. If a mixture of HFO-1234yf and HFO-1234ze is used, the blending ratio of HFO-1234yf and HFO-1234ze is used can be any ratio, but preferably is 0.3 to 0.7:0.7 to 0.3.

A copolymer in accordance with the present invention may contain vinyl ether units, vinyl ether units, or a combination thereof as component (b). Preferably, 5 to 45 mol % is used, and most preferably, 25-45 mol % is used. Examples of vinyl ether include alkyl vinyl ethers such as methyl vinyl ether, ethyl, propyl vinyl ether, n-butyl vinyl ether, isobutyl vinyl ether, hexyl vinyl ether, octyl vinyl ether, decyl vinyl ether and lauryl vinyl ether. Vinyl ethers including an alicyclic group can also be used, for example, cyclobutyl vinyl ether, cyclopentyl vinyl ether and cyclohexyl vinyl ether. Examples of vinyl esters include vinyl acetate, vinyl propionate, vinyl butyrate, vinyl pivalate, vinyl capronate, vinyl laurate, VEOVA-9 (vinyl versatate ester formed from a C9 carbocylic acid, produced by Momentive), VEOVA-10 (vinyl versatate ester formed from a C10 carbocylic acid, produced by Momentive) and vinyl cyclohexanecarboxylate.

Examples of the hydroxyalkyl vinyl ether of component (c) include hydroxyl-ethyl vinyl ether, hydroxypropyl vinyl ether, hydroxybutyl vinyl ether, hydroxypentyl vinyl ether and hydroxyhexyl vinyl ether. Preferably 3 to 30 mol % is used, and most preferably, 5 to 20 mol % is used.

The fluorocopolymer is preferably produced in a solution polymerization system. Examples of solvents for solution polymerization include: esters, such as methyl acetate, ethyl acetate, propyl acetate and butyl acetate; ketones, such as acetone, methyl ethyl acetone and cyclohexanone; aliphatic hydrocarbons, such as hexane, cyclohexane, nonane, decane, undecane, dodecane and mineral spirits; aromatic hydrocarbons, such as benzene, toluene, xylene, naphthalene, and solvent napthta; alcohols, such as methanol, ethanol, tert-butanol, iso-propanol, ethylene glycol monoalkyl ethers; cyclic ethers, such tetrahydrofuran, tetrahydropyran, and dioxane; fluorinated solvents, such as HCFC-225 and HCFC-141b; dimethyl sulfoxide; and the mixtures thereof.

Preferably, polymerization is conducted in a range of −30° C. to 150° C. depending on the polymerization initiation source and type of the polymerization medium.

The copolymer of the present invention is preferably prepared by copolymerizing those monomers and having a number average molecular weight of 5000 to 50000, and more preferably 5000 to 10000. Preferably, the copolymer has a molecular weight distribution of 2 to 10, more preferably 2.5 to 8, and most preferably 3 to 6. When the number average molecular weight is less than 5000, the copolymer is inferior in weatherability and chemical resistance, and when more than 50000, high viscosities may cause operational difficulties.

The copolymer of the present invention has hydroxyl groups and it is curable with curing agent such as melamine resin curing agent, urea resin curing agent, polybasic acid curing agent and a non-blocked polyisocyanate curing agent or a blocked polyisocyanate curing agent which are used for conventional thermosetting acryl coating. Examples of melamine resin curing agents include butylated melamine resin, methylated melamine resin, epoxymelamine resin and the like. Examples of non-blocked polyisocyanate 2,4- and 2,6-diisocyanatotoluene (TDI), diphenylmethane-2,4'- and/or -4,4'-diisocyanate (MDI), 1,6-hexamethylene diisocyanate (HDI), 1-isocyanato-3,3,5-trimethyl-5-5-isocyanatomethylcyclohexane (IPDI), dicyclohexylmethane diisocyanate (H12MDI), 1,4-diisocyanatobutane, 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanato-decane, 1,3- and 1,4-diisocyanatocyclohexane, 1,3- and 1,4-bis-(isocyanatomethyl)-cyclohexane, 4,4'-diisocyanatodicyclohexylmethane, 1-isocyanato-1-methyl-4(3)-isocyanato-methylcyclohexane (IMCI), bis-(isocyanatomethyl)-norbornane, 1,3- and 1,4-1,4-bis-(2-isocyanato-prop-2-yl)-benzene (TMXDI), 1,5-diisocyanatonaphthalene, 2,4'-, 4,4'-diisocyanatodiphenylmethane, and their dimers, trimers and polymers thereof. As to blocked polyisocyanate, preferred blocking groups employed for blocking include metal bisulfite, diethyl malonate (DEM) 3,5-dimethylpyrazole (DMP), methyl-ethylketoxime (MEKO) e-caprolactam (e-CAP), diisopropylamine, dimethyl-pyrazole, methyl ethyl ketoxime (butanone oxime), malonic acid diethyl ester, secondary amines triazole and pyrazole derivatives. When the curing is conducted at an ordinary by using polyisocyanate, it is possible to accelerate the curing by an addition of a conventional catalyst such as dibutyltin dilaurate Various solvents can be used for the preparation of solution-type paints or coatings with the copolymer of the present invention. Preferred solvents include aromatic hydrocarbons such as xylene and toluene; alcohols such as n-butanol; esters such as butyl acetate; ketones such as methyl isobutyl ketone, and glycol ethers such as ethyl cellusolve and various commercial thinners. When the copolymer of the present invention is used for producing a thermosetting composition for coating, a curing agent such as a melamine type curing agent, a urea type curing agent, a polybasic acid type curing agent, a polyisocyanate type curing agent or the like is simultaneously mixed in the mixing step mentioned above to produce a one-pack type coating.

On the other hand, when the composition is a normal temperature setting type coating which uses a polyisocyanate, the curing agent component is separately prepared to provide a two-pack type coating. In this case, the coating can be cured at room temperature for from several hours to several days, and has good properties by controlling the type of isocyanate and catalyst and their amounts to be added, the concentration of the copolymer, the contents of the hydroxyalkyl vinyl ether in the copolymer, and the like.

When the copolymer of the present invention is used as resin for paint or coating, it is possible to form under a mild condition, a film having excellent hardness of finish and gloss, flexibility, chemical resistance, stain resistance and weathering resistance. Such films are useful not only as a coating for pre-coated galvanized steel, colored aluminum plate and aluminum frames, but also as an on-site paintable non-thermally dryable paint. The paint or coating may be used for a number of substrates, including: metallic substrates; inorganic substrates such as glass, cement and concrete; organic substrates, for example, plastics (such as polyethylene, polypropylene, ethylene-vinyl acetate copolymer, nylon, acryl polyester ethylene-polyvinyl alcohol copolymer, vinyl chloride, vinylidene chloride) and wood materials. Specific applications for the paint or coating include, but are not limited to, the coating of aluminum swimming pools, the coating of colored glass intended for exterior use, and the coating of cement tile used for roofing.

The present invention is further illustrated by the following non-limiting examples.

Example 1

19.0 g of butyl acetate, 9.5 g of ethyl vinyl ether, 20.8 g of VEOVA-9, 8.0 g of hydroxybutyl vinyl ether, and 0.62 g of tert-butyl peroxypivalate were charged into a 300 ml stainless steel autoclave equipped with a stirrer. The mixture was solidified with liquid nitrogen, and deaerated to remove the dissolved air. Then, 50 g of 1,3,3,3-tetrafluoro-propene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 92%; Tg (glass transition temperature) of final copolymer=15° C.; Mn=7348; Mw=13789; Mw/Mn=1.87; final polymer concentration=74.7%; viscosity<500 cps.

Example 2

20.0 g of butyl acetate, 9.1 g of ethyl vinyl ether, 6.0 g of vinyl acetate, 6.7 g of hydroxybutyl vinyl ether, and 0.4 g. of tert-Butyl peroxypivalate were charged into a 300 ml stainless steel autoclave equipped with a stirrer. The mixture was solidified with liquid nitrogen, and deaerated to remove the dissolved air. Then, 40 g of 2,3,3,3-tetrafluoro-propene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 91%; Tg of final copolymer=11° C.; Mn=5314; Mw=12646; Mw/Mn=2.38; final polymer concentration=73.8%; viscosity<600 cps.

Example 3

20.0 g of butyl acetate, 8.0 g of ethyl vinyl ether, 17.4 g of VEOVA-9, 6.7 g. of hydroxybutyl vinyl ether, and 0.63 g. of tert-butyl peroxypivalate were charged into a 300 ml stainless steel autoclave equipped with a stirrer. The mixture was solidified with liquid nitrogen, and deaerated to remove the dissolved air. Then, 60 g of 1,3,3,3-tetrafluoro-propene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 93%; Tg of final copolymer=32° C.; Mn=7136; Mw=24103; Mw/Mn=3.37; final polymer concentration=81.1%; viscosity<700 cps.

Example 4

20.0 g of butyl acetate, 8.2 g of ethyl vinyl ether, 22.3 g of VEOVA-9, 3.4 g of hydroxybutyl vinyl ether, and 0.66 g of tert-butyl peroxypivalate were charged into a 300 ml stainless steel autoclave equipped with a stirrer. The mixture was solidified with liquid nitrogen, and deaerated to remove the dissolved air. Then, 50 g. of 1,3,3,3-tetrafluoro-propene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 85%; Tg of final copolymer=12° C.; Mn=4640; Mw=8079; Mw/Mn=1.74; final polymer concentration=78.1%; viscosity<600 cps.

Example 5

30.0 g of butyl acetate, 7.6 g of ethyl vinyl ether, 18.4 g of VeoVa-9, 6.7 g of hydroxybutyl vinyl ether, and 0.60 g of tert-butyl peroxypivalate were charged into a 300 ml stainless steel autoclave equipped with a stirrer. The mixture was solidified with liquid nitrogen, and deaerated to remove the dissolved air. Then, 60 g of 1,3,3,3-tetrafluoro-propene was added to the mixture, and the mixture was gradually heated to 65° C. in an autoclave. The mixture was stirred for 18 hours. After the autoclave was cooled to room temperature, the unreacted monomers were purged and the autoclave was opened. Excess solvent was removed via evaporation.

Yield 82%; Tg of final copolymer=22° C.; Mn=7640; Mw=17620; Mw/Mn=2.31; final polymer concentration=71.7%; viscosity<600 cps.

Application Example 26.1 g of the resulting copolymer was dissolved in 17.9 g of butyl acetate, and blended with 22.3 g of titanium oxide. The mixture was mixed for 1 hour by a paint shaker, then subsequently mixed with 14.8 g of DESMODUR BL4265, and 0.3 g of tin dilaurate (1% concentration). The mixture was then used to coat an aluminum substrate. About 72 hours later, the physical properties of the surface were tested.

The gloss (ISO 2813) of the surface=70 (20° C.); Hardness (Pencil Test; ASTM D3363)=3H; Flexibility (ASTM D4145)=3T; Adhesion (ASTM D3359)=5B.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A copolymer composition comprising:
   (a) from 40 mol % to 60 mol % of a first unit comprising a polymerized monomer of 1,3,3,3-tetrafluoropropene;
   (b) from 5 mol % to 45 mol % of a second unit comprising a polymerized monomer selected from the group consisting of vinyl esters, vinyl ethers and combinations thereof; and
   (c) from 3 mol % to 30 mol % of a third unit comprising a polymerized monomer comprising hydroxyl group-containing vinyl ether(s).

2. The copolymer composition of claim 1, wherein the copolymer composition comprises 45 to 55 mol % of said first unit.

3. The copolymer composition of claim 2, wherein the copolymer composition comprises 25 to 45 mol % of said second unit, wherein said second unit comprises combination of alkyl vinyl ethers and vinyl esters.

4. The copolymer composition of claim 3, wherein the copolymer composition comprises 5 to 20 mol % of said third unit, wherein said third unit consists of hydroxyalkyl vinyl ethers.

5. A process for the production of the copolymer of claim 1, wherein monomers are polymerized in a solution to produce the copolymer of claim 1.

6. The process of claim 5, wherein the copolymer has a number average molecular weight of between 5000 and 50000.

7. The process of claim 6, wherein the copolymer has a number average molecular weight of between 5000 and 10000.

8. A composition comprising at least 70 wt % of the copolymer of claim 1.

9. The copolymer composition of claim 8, wherein the composition comprises at least 80 wt % of the copolymer.

10. The copolymer composition of claim 8, wherein the composition comprises 15-25 wt % solvent.

11. The copolymer composition of claim 1 wherein:
    (a) said first unit consists of polymerized monomer of 1,3,3,3-tetrafluoropropene; and
    (b) said second unit consists of polymerized monomer selected from combinations of vinyl esters and vinyl ethers.

12. The copolymer composition of claim 11, wherein the copolymer composition comprises 45 to 55 mol % of said first unit.

13. The copolymer composition of claim 12, wherein the copolymer composition comprises 25 to 45 mol % of said second unit.

14. The copolymer composition of claim 13, wherein the copolymer composition comprises 5 to 20 mol % of said third unit.

15. The composition of claim 1, wherein the composition comprises 15-50 wt % solvent.

16. The composition of claim 1, wherein the composition comprises 15-25 wt % solvent.

17. A paint comprising the copolymer composition of claim 1.

18. A substrate painted with the paint of claim 17.

19. The substrate of claim 18 wherein the substrate is selected from the group consisting of metallic substrates; inorganic substrates; organic substrates; and wood substrates.

20. The substrate of claim 18 wherein the substrate is a plastic substrate formed from polyethylene, polypropylene, ethylene-vinyl acetate copolymer, nylon, acryl polyester ethylene-polyvinyl alcohol copolymer, vinyl chloride, vinylidene chloride and combinations of these.

21. A coating comprising the copolymer composition of claim 1.

22. A substrate coated the coating of claim 21.

23. The substrate of claim 22 wherein the substrate is selected from the group consisting of metallic substrates; inorganic substrates; organic substrates; and wood substrates.

24. The substrate of claim 22 wherein the substrate is a plastic substrate formed from polyethylene, polypropylene, ethylene-vinyl acetate copolymer, nylon, acryl polyester ethylene-polyvinyl alcohol copolymer, vinyl chloride, vinylidene chloride and combinations of these.

25. The composition of claim 1 wherein said vinyl ester is a compound of formula $CH_2=CR_1-O(C=O)xR_2$ and said vinyl ether is a compound of formula $CH_2=CR_3-OR_4$ wherein $R_1$ and $R_3$ is hydrogen or a methyl group, and wherein $R_2$ and $R_4$ is an unsubstituted straight-chain, branched-chain or alicyclic alkyl group having 1 to 12 carbon atoms.

26. The composition of claim 1 wherein said hydroxyl group-containing vinyl ether(s) is a compound of formula $CH_2=C-R_5-OR_6$, wherein $R_5$ is hydrogen or a methyl group, and $R_6$ is an unsubstituted straight-chain, branched-chain or alicyclic alkyl group having a hydroxyl groups.

27. The composition of claim 1 wherein said second unit consists essentially of ethyl vinyl ether and wherein said third unit consists essentially of hydroxyl butyl ether.

28. The composition of claim 27 wherein said copolymer consists essentially of said first units, said second units and said third units.

29. The composition of claim 1 wherein said second unit consists of ethyl vinyl ether.

30. The composition of claim 1 wherein said third unit consists of third unit consists of hydroxyl butyl ether.

31. The composition of claim 1 wherein said copolymer consists essentially of said first units, said second units and said third units.

* * * * *